United States Patent [19]
Kimura et al.

[11] 3,927,413
[45] Dec. 16, 1975

[54] MOTOR-DRIVEN DEVICE FOR USE IN A LONG FILM STRIP MAGAZINE

[75] Inventors: Shuji Kimura; Kouichi Takahata, both of Tokyo, Japan

[73] Assignee: Nippon Kogaku K. K., Tokyo, Japan

[22] Filed: May 23, 1974

[21] Appl. No.: 472,676

[30] Foreign Application Priority Data
May 25, 1973 Japan................................ 48-57684

[52] U.S. Cl. ............................................. 354/173
[51] Int. Cl.² ...................... G03B 1/00; G03B 19/04
[58] Field of Search............................ 354/171, 173

[56] References Cited
UNITED STATES PATENTS

| | | | |
|---|---|---|---|
| 3,656,420 | 4/1972 | Aizawa et al. ...................... | 354/173 |
| 3,688,669 | 9/1972 | Ogiso et al........................... | 354/171 |
| 3,753,391 | 8/1973 | Kimura et al. .................. | 354/173 X |
| 3,754,455 | 8/1973 | Tsujunoto et al................... | 354/173 |
| 3,762,291 | 10/1973 | Kimura et al. ...................... | 354/171 |

*Primary Examiner*—Joseph F. Peters, Jr.
*Attorney, Agent, or Firm*—Fitzpatrick, Cella, Harper & Scinto

[57] ABSTRACT

In an electrically-operated photograhic camera having a first electric motor to transfer a definite length of film strip through a film transfer mechanism at each transfer action accompanied by a simultaneous cocking or charging of a camera shutter, and a second electric motor to take care of winding of the transferred film strip on a film winding spool provided in the film magazine, a motor-driven device for use in a long film strip magazine to be equipped with such photographic camera is constructed in such a manner that the second electric motor for the film winding is caused to stop at a time instant prior to stoppage of the first electric motor to give the film strip spanned between the film transfer mechanism and the film winding spool a certain amount of slack or relaxation so as to prevent undesirable tension from being imparted to the film.

4 Claims, 14 Drawing Figures

MOTOR-DRIVEN DEVICE FOR USE IN A LONG FILM STRIP MAGAZINE

BACKGROUND OF THE INVENTION

1. Field of the Invention

This invention relates to a motor-driven device for use in a long film strip magazine, and, more particularly, it is concerned with a film winding device in an electrically-operated camera.

2. Description of the Prior Art

Generally speaking, there have already been proposed various kinds of electrically-operated cameras which perform winding of a film strip on a spool accompanied by simultaneous cocking (or charging) of a shutter mechanism, and in which a rear cover of the camera is replaced by a magazine containing a long strip of photographic film so as to cause a sprocket in the camera to rotate by means of an electric motor provided therein, and, at the same time, to cause a winding (or take-up) spool in the film magazine to rotate by means of another motor provided in the film magazine thereby to perform transfer of one exposed frame of the film an its winding on the spool.

However, the electrically-operated camera fo such construction has been suffering from the following defects. That is:

1. One of the pairs of perforations provided at both sides of the film strip for engagement with the sprocket wheel are liable to interpose between the adjacent exposed frames of the film; and 2. An excessive tension remains with the film as the result of its being wound by the two electric motors, which tension maintained in a balanced state is broken by a shock caused at the time of releasing the shutter, whereby the film slightly displaces at the exposure time to blur the photographed image on the exposed film.

SUMMARY OF THE INVENTION

With the afore-described disadvantages inherent int he known types of the electrically-operated camera using a magazine of a long film strip in mind, it is the primary object of the present invention to provide a motor-driven device for use in a long film strip magazine to be equipped with an electrically-operated camera, wherein the afore-described defects are completely removed, i.e., no side perforations come between the adjacent exposed frames of the film, and no excessive tension remains with the film upon its winding on the spool.

According to the present invention, there is provided a motor-driven device for use in a long film magazine to be equipped with an electrically-operated photographic camera which comprises in combination: a camera body having therein a film transfer means and a first prime mover to operate said film transfer means with simultaneous shutter charging; a magazine for a long strip of photographic film having therein a film winding spool and a second prime mover to operate said film winding means; and an electric control circuit to stop said second prime mover at an instant prior to stoppage of said first prime mover, thereby giving the photographic film spanned between said film transfer means and said film winding means a slight degree of slack or relaxation so as to prevent any undersirable tension from being imparted thereto.

The foregoing object of the present invention as well as the detailed construction of the device, functions and operations of the principal members thereof, and the meritorious effects to be derived therefrom will become more clearly understandable from the following description when read in conjunction with the accompanying drawing, in which the identical or similar members performing the same or similar functions are represented by like reference numerals or symbols.

BRIEF DESCRIPTION OF THE DRAWINGS

FIGS. 1 (A), 1(B), 2(A), and 2(B) are explanatory diagrams showing, respectively, a positional relationship between the sprocket teeth and the corresponding side perforation as well as between the side perforations and the exposed frames of a photographic film strip used in a conventional electrically-operated camera;

DESCRIPTION OF THE PREFERRED EMBODIMENT

First of all, with a view to facilitating understanding of the present invention, a more detailed description on the afore-described prior art will be made in reference to FIGS. 1(A), 1(B), 2(A), 2(B) and 2(C) of the accompanying drawing.

Figure 1A:
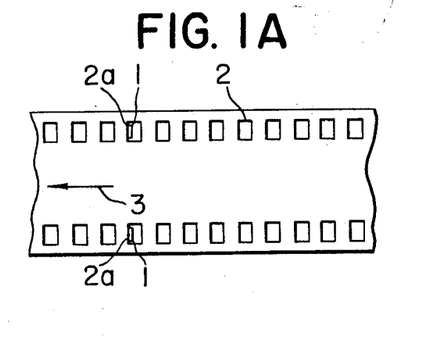

The conventional type of electrically-operated camera, when not using the long film strip magazine, is so constructed that it rotates a sprocket and a winding spool (not shown) which is linked by gears with the sprocket within the camera body by means of an electric motor built in the camera body, whereby the film strip is transferred by one frame after another by the sprocket in the arrow direction 3 in FIG. 1(A), while it is being wound on the winding spool.

In this type of the film winding operation, the positional relationship between a pair of teeth 1 of the sprocket and the corresponding perforations 2 provided at both sides of the film strip is such that the teeth 1 contact one side 2a of the rectangular perforations 2, i.e., in the forwarding direction 3 of the film strip (or direction of the film transfer), as shown in FIG. 1(A).

Figure 1B:
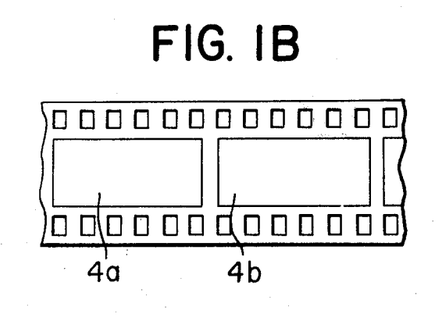

On the other hand, the positional relationship between the side perforations 2 in the film strip and the adjacent exposed frames 4a, 4b thereon is so determined, by setting the positional relationship between the exposed frame and the sprocket teeth, that no perforation should interpose between the adjacent exposed frames as far as the sprocket teeth 1 and the film perforations 2 maintaian the abovementioned positional relationship, as shown in FIG. 1(B).

Figure 2A:
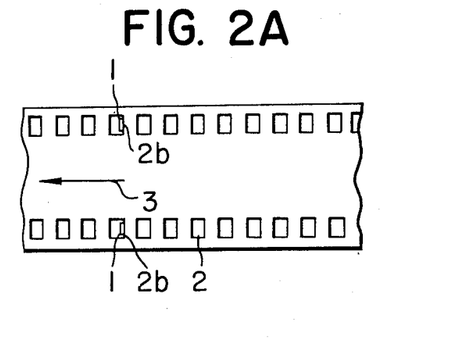
Figure 2B:
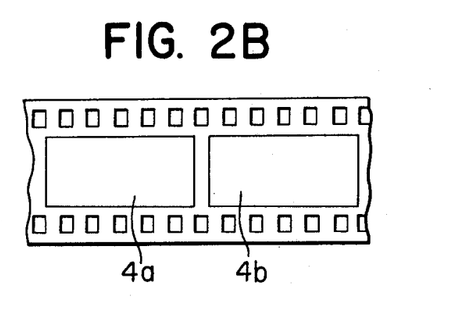
Figure 2C:
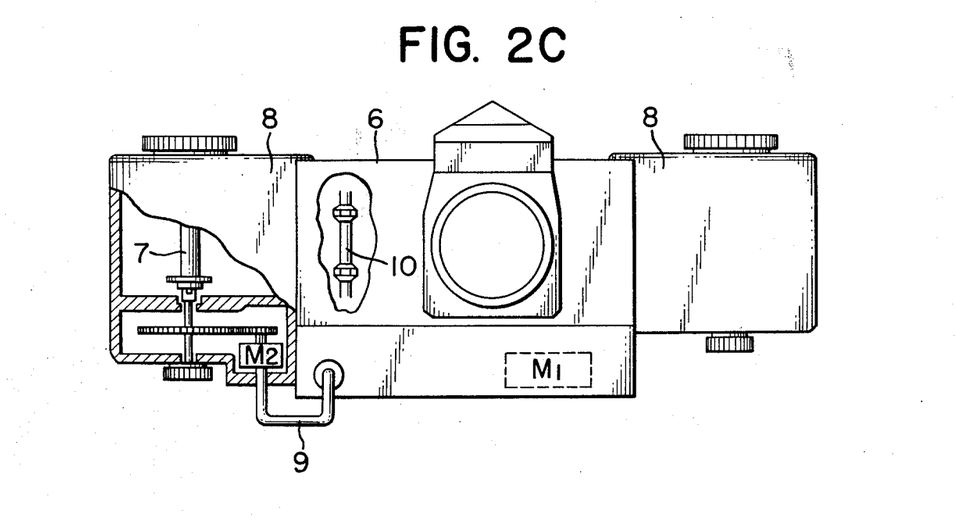
FIG. 2(C) is a front view of an electrically-operated camera, onto which a conventional long film strip magazine is mounted.

In an electrically-operated camera of a known type as shown in FIG. 2(C), wherein a rear cover of the camera body is replaced by a long film strip magazine, the film magazine 8 is constructed with a winding spool 7 for the long film strip, an electric motor M2 to rotate the winding spool, and a connector 9 to connect the electric motor M2 with a power source (not shown) provided within the camera body. In this structure, the electric motor M2 is so constructed that it is driven by electric power from the power source so long as another electric motor M1 provided in the camera body is driven by the power source to rotate a sprocket 10.

In such electrically-operated camera using the long film strip magazine, the film is transferred mainly by the winding spool 7 which is rotated by the motor M2, while the sprocket 10 serves to control the film length to be transferred rather than functions as the film transfer means. Accordingly, upon completion of the film winding, the sprocket teeth 1 and the film perforations 2 are in such a positional relationship that the sprocket teeth 1 contact the other side 2b of the rectangular perforations 2 as shown in FIG. 2(A), which is in the direction opposite to the forwarding direction of the film strip in the case shown in FIG. 1(A).

It is therefore apparent that, before and after mounting of the long film strip magazine onto the camera body, the positional relationship between the sprocket teeth and the perforations at both sides of the film becomes different; in other words, the direction of force acting on the sprocket becomes reversed and, due to difference in width of the film perforation and the sprocket teeth as well as plays existing in the linking members between the sprocket and the winding mechanism, the film perforations 2 are positioned between the adjacent exposed frames 4a, 4b as shown in FIG. 2(B). This interposition of the film perforations between the adjacent exposed frames would bring about inconvenience in handling when the film is developed and cut into individual frame.

Further, this film is maintained in a balanced state with frictional force acting on the sprocket 10, the winding spool 7, a film guide roller (not shown), and so on in its state of being tensioned between the winding spool 7 and the sprocket 10. In this state of the film, when the shutter is released, the abovementioned sustained balance is lost due to a shock at the shutter release, and the film is subjected to a slight displacement owing to its tensile force with the consequence that the photographed image on the film is inevitably blurred.

On the basis of the foregoing description of the prior art, the proposed device according to the present invention will be explained hereinbelow in detail in reference to FIGS. 3(A), 3(B), 3(C), 4, 5(A), 5(B), 6(A), 6(B) and 6(C) which show preferred embodiments thereof.

Figure 3A:
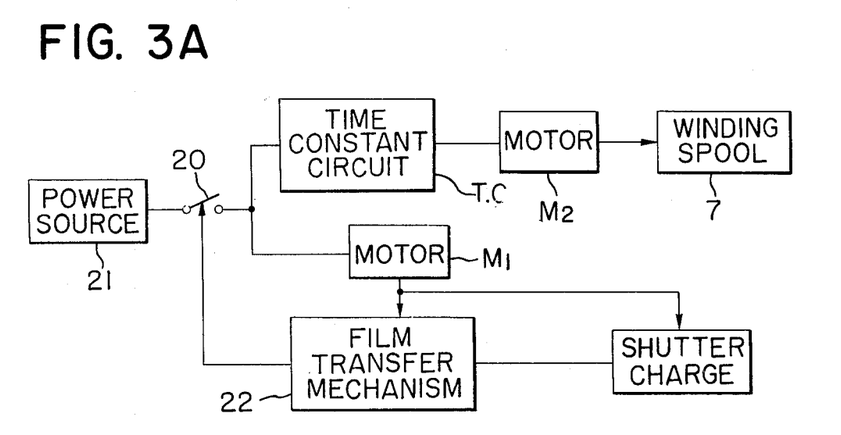
FIGS. 3(A) and 3(B) are block diagrams explaining the first embodiment of the device according to the present invention.

Referring to FIG. 3(A) which shows the first embodiment of the present invention, which embodiment can be similar to that shown in FIG. 2(C), the built-in electric motor M1 of the electrically-operated camera which performs the film transfer and the simultaneous charging (or cocking) of the shutter is connected to a power source 21 through a switch 20. On the other hand, the electric motor M2 which is to rotate the winding spool 7 provided in the long film strip magazine is also connected to the power source 21 through a time-constant circuit TC and the switch 20.

This switch 20 is interconnected with a film transfer mechanism 22 in such a manner that it is closed when the film transfer mechanism 22 including the sprocket 10 to be driven by the motor M1 is transferring the film, and that it is open when the film winding is complete.

The linking mechanism for the switch 20 and the film transfer mechanism 22 is specifically disclosed in a U.S. Pat. No. 3,748,986, entitled MOTOR DRIVE SYSTEM FOR CAMERA, hence reference should be made to this patent for any detail thereof.

The time-constant circuit TC functions to detect the lapsed time beginning from the closure of the swtich 20, to introduce electric current from the power source 21 into the motor M2 during a certain definite time period to be determined by the extablished time-constant in the circuit from the closure of the switch 20, and to prevent the current from flowing into the motor M2 after lapse of the determined time period. Accordingly, selection of a time-constant in the time-constant circuit TC makes it possible to slightly shorten the electric conduction time in the motor M2 in comparison with that in the motor M1 as shown by the time instant $t$ in FIG. 3(C).

Figure 3B:
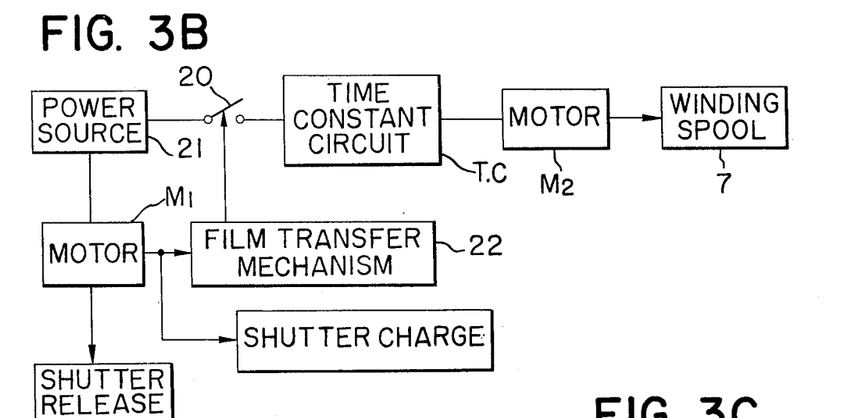
Figure 3C:
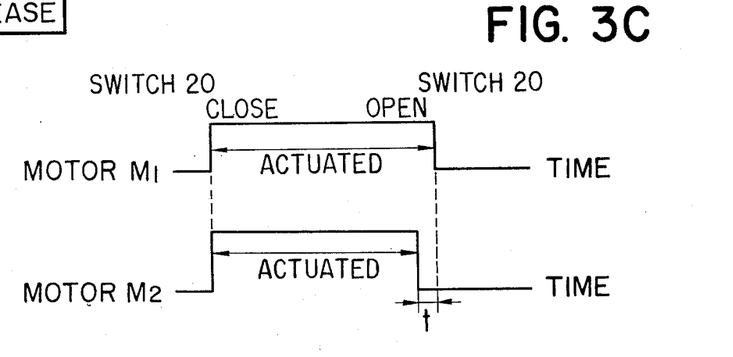
FIG. 3(C) is a comparative graphical representation showing the electric conduction time in each of two electric motors used for the device.

By thus selecting the time-constant in the time-constant circuit TC, the sprocket 10 further continues to transfer the film for the time instant $t$ (as shown in FIG. 3(C) even after the winding spool 7 in the long film strip magazine stops its rotation. In this consequence, the film strip between the sprocket 10 and the winding spool 7 slightly slackens upon completion of the film winding without accompanying excessive tension imparted thereto, and both the sprocket teeth and the film perforations as well as both the exposed frame of the film and the perforations are maintained in their desirable positional relationship as shown in FIGS. 1(A) and 1(B) respectively. In addition, the film no longer displaces by the shock caused at the time of the shutter release.

FIG. 3(B) indicates a case, in which the time-constant circuit TC is provided in an electrically-operated camera, the built-in motor M1 of which performs the shutter charging, the film transfer, and the shutter releasing. The operations of this type of camera are exactly same as those of the camera shown in FIG. 3(A), hence any detailed explanations are dispensed with.

Figure 4:
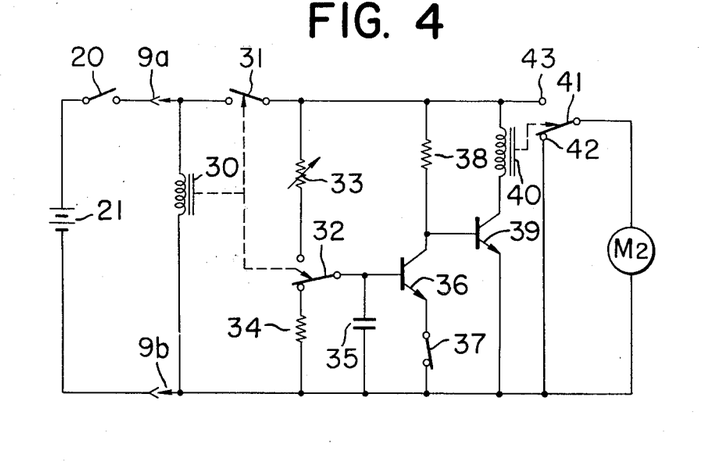
FIG. 4 is a physical circuitry diagram of the first embodiment of the present invention.

FIG. 4 indicates one example of the physical wiring system of the motor M2, the time-constant circuit TC, the switch 20, and the power source 21 as in FIGS. 3(A) and 3(B). In this circuitry construction, a first relay winding 30 is connected to the power source 21 through the switch 20. Relay switches 31, 32 are actuated by the relay winding 30. The switch 31 is connected, at its one end, to the junction of the first relay winding 30 and the switch 20, and, at its other end, to one terminal of a variable resistor 33. This relay switch 31 is so constructed that it is closed only when electric current is flowing through the first relay winding 30. On the other hand, the relay switch 32 is so constructed that it is usually connected to one terminal of a resistor 34 and becomes connected to the variable resistor 33 only when electric current is flowing through the first relay winding 30. The other terminal of the resistor 34 is connected to the negative side of the power source 21. A capacitor 35 is connected to the resistor 34 in parallel through the switch 32. A CR circuit is constructed by this capacitor 35 and the variable resistor 33.

The base of a transistor 36 is connected to a junction of the relay switch 32 and the capacitor 35, the emitter thereof to the negative side of the power source 21 through a switch 37 to be explained hereinafter, which is usually closed, and the collector thereof to the relay switch 31 through a resistor 38. Also, the base of a transistor 39 is connected to a junction of the collector of the transistor 36 and the resistor 38, the emitter thereof to the negative side of the power source 21, and the collector to the relay switch 31 through a second relay winding 40.

A switch 41 which is actuated by the second relay winding 40 is in contact with a contact 42 connected to the negative side of the power source 21 while the second relay winding 40 is not being excited, and is in contact with a contact 43 connected to the relay switch 31 while the second relay winding 40 is being excited.

The electric motor M2 which is to rotate the winding spool in the long film strip magazine is connected at one terminal thereof to the negative side of the power source 21, and, at the other terminal thereof, to the switch 41. Accordingly, by the electric conduction of the second relay coil 40, the motor M2 is fed with electric power from the power source 21 only when the switch 41 is in contact with the contact 43. In this embodiment, the power source 21 and the switch 20 are provided in the camera body, and the remaining component 30 to 43 and the motor M2 are all accommodated within the film magazine, these separated components being jointed together for operations by means of connectors 9a, 9b.

The electrically-operated camera using the long film strip magazine of the afore-described construction operates in the following manner.

When the motor M1 in the camera body is actuated, the film is transferred by the rotation of the winding spool, and, at the same time, the switch 20 linked with the film transfer mechanism is closed. The closure of the switch 20 causes electric power to be fed into the first relay winding 30 with the consequent separation of the relay switch 32 from the resistor 34 so as to be connected to the variable resistor 33. Accordingly, the capacitor 35 is charged by electric current flowing thereinto through the variable resistor 33.

Since the transistor 36 is non-conductive until the terminal voltage of the capacitor 35 reaches a predetermined value, the transistor 39 becomes conductive as soon as the relay switch 31 is closed, whereby current flows into the second delay winding 40 and the switch 41 comes to contact with the contact 43. In this way, when the switch 20 is closed, the motor M2 in the film magazine is immediately energized by the electric conduction to thereby rotate the winding spool in the film magazine to take up the film strip which has been transferred by the driving force of the motor M1. After this, when the terminal voltage of the capacitor 35 reaches the predetermined value by its electric charging, the transistor 36 becomes conductive. It goes without saying that, during this period, the switch 37 is maintained in its closed state. As the consequence of the transistor 36 becoming conductive, the transistor 39 is brought to a non-conductive state, whereby the switch 41 is switched over from the contact 43 to the contact 42, and the motor M2 thus stops rotation.

As it will be apparent from the forgoing explanations, the conduction time of the motor M2 corresponds to the time period of from the closure of the switch 20 to the attainment of the predetermined terminal voltage in the capacitor 35, and this time period is governed by the time-constant of the CR circuit composed of the capacitor 35 and the variable resistor 33.

Accordingly, when the time-constant of the CR circuit, i.e., the electrostatic capacitance of the capacitor 35 and the resistance of the variable resistor 33, is so selected that the electric conduction time in the motor M2 is made slightly shorter than that in the motor M1, rotation of the winding spool can be stopped prior to completion of the film transfer by the spool, whereby the film strip extending between the sprocket and the winding spool can be given a slight degree of slack or relaxation. As the result of this, no excess tension is imparted the film at the end of the winding operation, and the positional relationship between the side perforations and the exposed film frame can be maintained in a desirable state as shown in FIG. 1(B). When the film winding is completed, the switch 20 is opened and the remaining switches 31, 32 also return to their open state as shown in FIG. 4 with the consequence that the electric charge in the capacitor 35 is discharged through the resistor 34.

In the following, the function of the switch 37 will be explained to a full extent.

When a long film strip of as long as 250 frames is loaded in the long film strip magazine, there is usually performed blank photographing of five to seven frames. During this blank photographing, the switch 37 is kept in its open state so as to make the time-constant circuit TC inoperative and to equalize the electric conduction time in both motors M1 and M2. In so doing, it is possible to prevent any slack from occurring in the film spanned between the sprocket and the winding spool, thereby tightly fastening the end of the film strip to the winding spool. The switch 37 is for such purpose.

In order to attain this purpose, the switch 37 is interconnected to a film counter (not shown) so that it may be opened during the period of the blank photographing. While the switch 37 is open, the transistor 36 remains non-conductive, even if the terminal voltage of the capacitor 35 reaches the aforementioned predetermined value, hence the transistor 39 remains conductive. In the end, the electric conduction time in the motor M2 is determined by the opening and closing of the switch 20, and becomes equal to the electric conduction time in the motor M1.

The embodiments shown in FIGS. 5(A), 5(B), 6(A), 6(B) and 6(C) are feasible to achieve the purpose of the present invention, even when the power source voltage fluctuates.

Generally speaking, the type of the power source for use in such electrically-operated cameras is dry cells. Accordingly, when the voltage in the cells 21 lowers due to their comsumption, the number of revolution of the motor M1 and M2 decreases. When the voltage drops, the electric conduction time in the motor M1 and M2 is required to increase for the transfer of one exposed film frame.

Since the stoppage of the motor M1, upon completion of the transfer of one film frame, is done by the film transfer mechanism which has detected completion of the film winding, the electric conduction time in the motor M1 becomes extended for the required time period even when the number of revolution of the motor M1 decreases. In this consequence, the transfer of the film strip by the sprocket is not at all affected by the power source voltage and the one film frame can always be transferred with accuracy.

According to the experiments done by the present inventors, the droppage in the power source voltage and the electric conduction time in the motor M2 required for winding one film frame have been recognized to be in the ralationship of the primary function (i.e., the linear relationship.

However, stoppage of the motor M2 is determined by the charging time of the CR circuit as already mentioned while, in the CR circuit, the charging time and the source voltage are in the relationship of an exponential function, and not in the relationship of the primary function. Consequently, winding of the film on the winding spool by the motor M2 is subjected to variations in the source voltage, whereby, in the case of the afore-described first embodiment, the quantity of the film to be wound on the winding spool varies due to variations in the source voltage.

In order therefore to secure a constant quantity of the film to be wound on the spool irrespective of fluctuations in the source voltage, it is necessary that the electric conduction time in the motor M2 be varied linearly (i.e., in the relationship of the primary function) with respect to the quantity variant.

This will be explained in more detail in reference to the accompanying drawing.

Figure 5A:
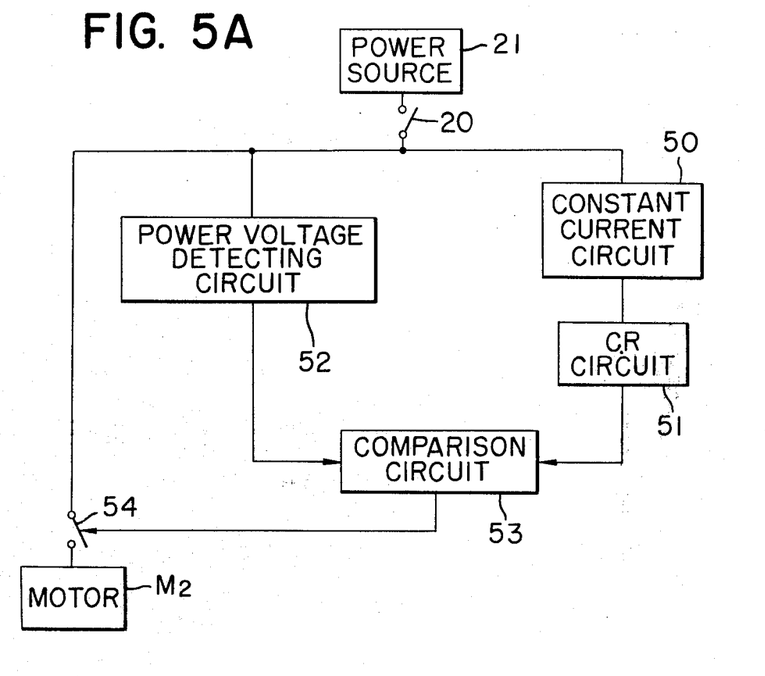
FIG. 5(A) is a block diagram explaining the second embodiment of the device according to the present invention.

In FIG. 5(A) which shows a block diagram of the second embodiment according to the present invention, the CR circuit 51 is charged with a constant current from a constant current circuit 50 which is connected to the power source 21 by way of the switch 20. Accordingly, the terminal voltage of the capacitor in this CR circuit 51 is proportional to the charging time thereof. This terminal voltage stands for the output voltage of the CR circuit.

A source voltage detection circuit 52 connected to the power source 21 by way of the switch 20 detects the voltage value of the source 21 and generates an output voltage in proportion to the source voltage. The switch 20 is interconnected with the film transfer mechanism and is made open and close in the same manner as in the afore-described first embodiment.

A comparison circuit 53 is to compare an output voltage from the source voltage detection circuit 52 with an output voltage from the CR circuit 51, and to open the switching circuit 54 when the difference between the compared output voltage values reaches a predetermined value to cut off the electric conduction in the motor M2.

Therefore, if the source voltage detection circuit 52 is so constructed that, when the source voltage drops, the output voltage of the circuit 52 increases linearly (or, in the relationship of the primary function), the time constant until the difference between the output voltage of the source voltage detection circuit 52 and the output voltage of the CR circuit 51 reaches the abovementioned predetermined value at the time of the voltage drop, or the charging time in the CR circuit, becomes increased linearly with respect to the voltage drop in the power source.

Accordingly, even when the source voltage drops, the electric conduction time in the motor M2 can be increased linearly in correspondence to the voltage drop. Further, by appropriate selection of the current value in the constant current circuit 50 or the electrostatic capacitance of the capacitor in the CR circuit 51, the film strip spanned between the sprocket and the winding spool can be given a slight degree of relaxation, and, at the same time, the film winding of a required length can always be achieved.

Figure 5B:
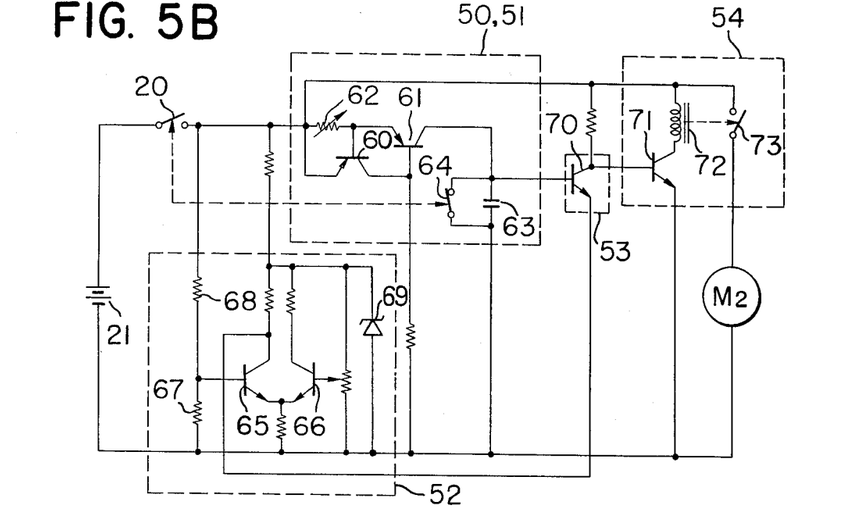
FIG. 5(B) is a physical circuitry diagram of the second embodiment of the present invention.

Referring now to FIG. 5(B) which shows a physical wiring of the block diagram shown in FIG. 5(A), the constant current curcuit 50 is composed of transistors 60, 61 and a variable resistor 62, while the CR circuit 51 is composed of a capacitor 63 and the resistance component of the abovementioned constant current circuit 50.

A switch 64 to discharge an electric charge accumulated in the capacitor 63 is interconnected with the switch 20 in such a manner that it is closed when the switch 20 is open, and it is open when the switch 20 is closed. On the other hand, a differential amplifier is constructed with transistors 65, 66, in which the source voltage is divided by resistors 67, 68, so that the electric potential at the connection of the two resistors 67, 68 becomes proportional to the fluctuations in the source voltage.

A Zener diode 69 is connected to the differential amplifier composed of the transistors 65, 66 in parallel, the terminal voltage of which is maintained constant irrespective of the fluctuations in the source voltage.

Accordingly, while the base potential of the transistor 66 which is one of the inputs in the differential amplifier is maintained constant without regard to the fluctuations in the source voltage, the base potential of the transistor 65 which constitutes the other input in the differential amplifier is in proportion to the fluctuations in the source voltage and has the same phase therewith, because the base is connected to the junction of the resistors 67, 68. In this consequence, the collector potential of the transistor 65 which constitutes the output terminal of the differential amplifier is proportional to the fluctuations in the source voltage and has an inverse phase therewith. In other words, when the source voltage drops, the collector potential increases linearly.

The source voltage detection circuit 52 is thus constructed with the transistors 65, 66, resistors 67, 68, and the Zener diode 69.

Further, the comparison circuit 53 is composed of a transistor 70, the base of which is connected to one terminal of the capacitor 63, and the emitter of which is connected to the collector of the transistor 65 which constitutes the output of the source voltage detection circuit 52.

This transistor 70 compares an output of the source voltage detection circuit 52 with that of the CR circuit, and, when the difference between the two output values reaches a predetermined value (i.e., a threshold voltage of this transistor), it becomes conductive.

The switching circuit 54 is composed of a transistor 71, a relay winding 72, and a relay switch 73. The relay switch is so constructed that, while current is flowing in the relay winding, it is kept closed. The transistor 71 is so constructed that it is conductive when the transistor 70 in the comparison circuit 53 is non-conductive, and it becomes non-conductive when the transistor 70 is conductive.

In the afore-described circuitry construction, when the switch 20 is closed in synchronism with the operation of the film transfer mechanism due to the built-in motor M1 in the camera body, the transistor 71 becomes conductive, while the relay switch 73 is closed to actuate the motor M2 in the film magazine to wind the trnasferred film strip on the winding spool. During these operations, the transistor 70 remains non-conductive, since the terminal voltage of the capacitor 63 is zero. Subsequent to completion of the above-described series of operations, this transistor 70 becomes conductive when the capacitor 63 begins to be charged by a constant current from the constant current circuit 50, and augments its terminal voltage in proportion to the charging time, and when the difference between the terminal voltage of the capacitor 63 which is proportional to the time period beginning from the closure of the switch 20 (i.e., the conduction time in the motor M2) and the collector potential of the transistor 65 in relation to the source voltage reaches a predetermined value. Upon the transistor 70 being conductive, the transistor 71 becomes non-conductive, whereby the relay switch 73 is open and the motor M2 stops.

Accordingly, by appropriate selection of a resistance value of the variable resistor 62 in the constant current circuit 50 or an electrostatic capacitance of the capacitor 63 in the same circuit, it becomes possible to make the conduction time in the motor M2 slightly shorter than the conduction time in the motor M1 and, at the same time, to vary the conduction time in the motor M2 in linear relationship (or in the relationship of the primary function) with respect to the fluctuations in the source voltage, whereby one film frame can be constantly wound on the winding spool.

Next, the third embodiment of present invention will be explained hereinbelow in reference to FIGS. 6(A) to 6(C).

Figure 6A:
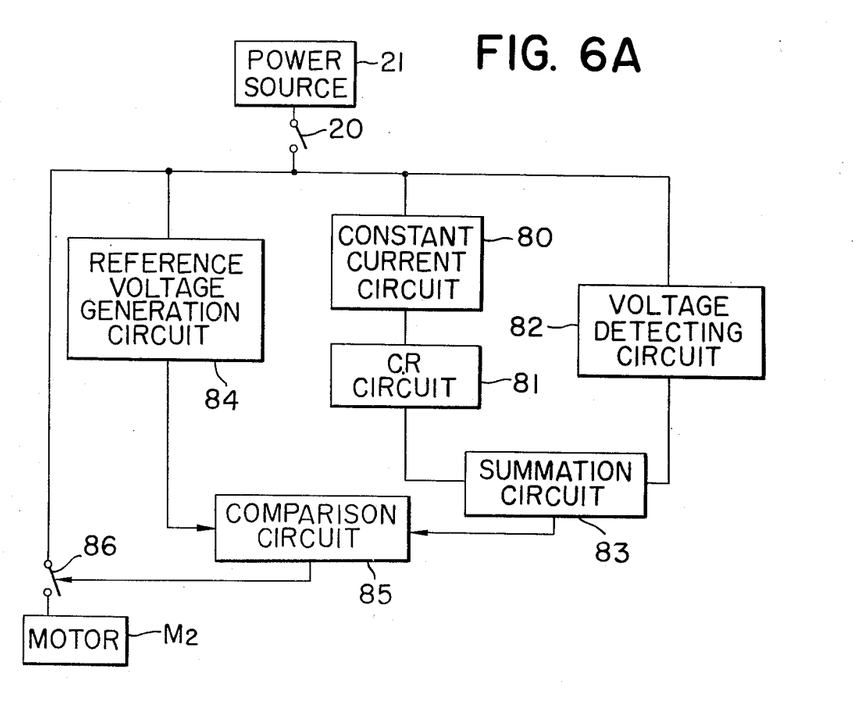
FIG. 6(A) is a block diagram explaining the third embodiment of the device according to the present invention.

Referring first to FIG. 6(A) which shows the block diagram of the third embodiment, a constant current circuit 80 and a CR circuit 81 do the same functions as the corresponding component circuits 50 and 51 in the foregoing second embodiment. A voltage detection circuit 82 is in proportion to the fluctuations in the source voltage, and to generate a voltage of the same phase as that of the source voltage. A summation circuit 83 is to generate an output voltage which is a sum of an output voltage from the CR circuit 81 and an output voltage from the abovementioned voltage detection circuit 82.

A reference voltage generation circuit 84 is to generate a constant reference voltage without regard to the fluctuations in the source voltage.

A comparison circuit 85 is to compare an output voltage of the summation circuit with the abovementioned reference voltage, and the cause the switching circuit 86 to open to stop the motor M2 when the difference in the compared values reaches a predetermined one. Accordingly, if it is assumed that the source voltage drops, the output voltage of the voltage detection circuit 82 also drops linearly (i.e., in the relationsip of the primary function). This results in prolongation of the charging time in the CR circuit 81 until such time when the difference between the output voltage of the summation circuit and the reference voltage reaches the predermined value. In consequence of this, the conduction time in the motor M2 is augmented linearly (or, in the relationship of the primary function) with respect to the droppage in the source voltage, and the same effect as in the second embodiment can be obtained.

Figure 6B:
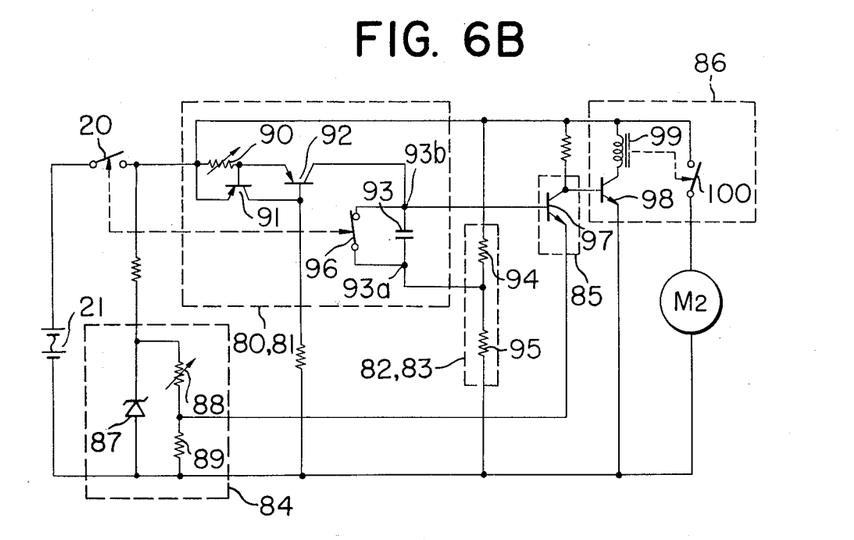
FIGS. 6(B) and 6(C) are respectively physical circuitry diagrams of the third embodiment of the present invention.

In FIG. 6(B) which shown one example of a physical circuitry construction of the block diagram in FIG. 6(A), the reference voltage generation circuit 84 is composed of a Zener diode 87, a variable resistor 88, and a resistor 89. The reference voltage is generated at the connection of the resistor 88, 89. The constant current circuit 80 is composed of a variable resistor 90 and transistors 91, 92. The CR circuit 81 is composed of a capacitor 93 and a resistance component of the above-mentioned constant current circuit 80. A discharging switch 96 of the capacitor 93 is inter-connected with the switch 20 in exactly the same manner as the switch 64 in FIG. 5(B). Both voltage detection circuit 82 and the summation circuit 83 are composed of two resistors 94, 95.

The resistors 94, 95 divide the source voltage, and the divided voltage is impressed on one terminal 93a of the capacitor 93, so that, at the other terminal 93b, there appears a sum of the terminal voltage of the capacitor and the divided source voltage at the resistors 94, 95.

In the comparison circuit 85, the abovementioned reference voltage and the divided source voltage added to the capacitor 93 are compared by the transistor 97 which constitutes the circuit.

The switching circuit 96 is composed of a transistor 98, a relay winding 99, and a relay switch 100, wherein the transistor 98 is so constructed that it is conductive when the transistor 97 of the comparision circuit 85 is non-conductive, and it becomes non-conductive when the transistor 97 is conductive; also, the relay switch 100 is constructed in such a manner that it is closed only when current is flowing through the relay winding 99.

Figure 6C:
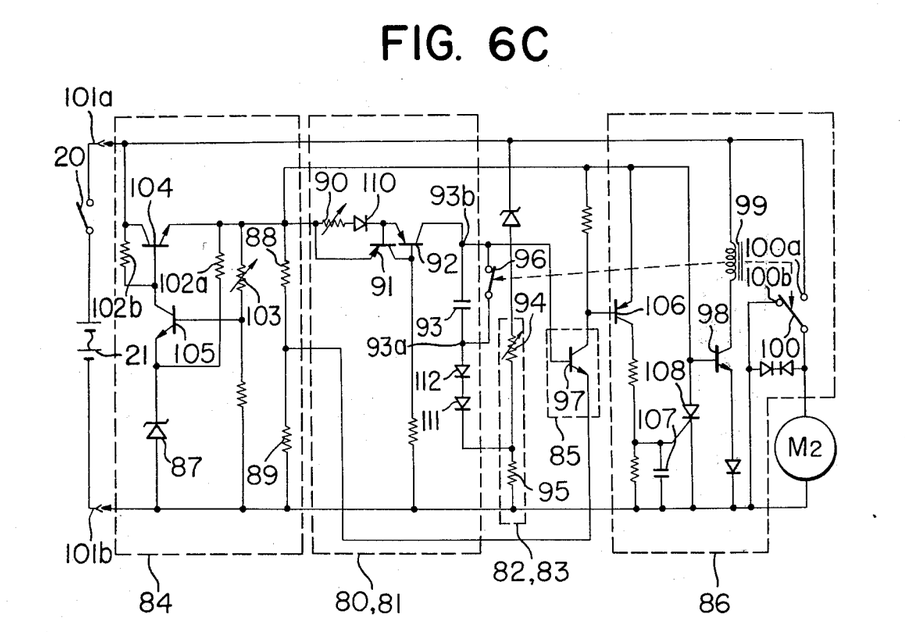

FIG. 6(C) indicates an improved circuitry system over that shown in FIG. 6(B).

In this circuit construction, a constant voltage circuit constructed with resistors 102a, 102b, 103, transistors 104, 105, and a Zener diode 87 are provided, and the constant current circuit 80 consisting of a variable resistor 90, transistors 91, 92 is connected to this constant voltage circuit. Consequently, the constant current from this constant current circuit is always stable without being affected by the variations in the source voltage, whereby the capacitor 93 of the CR circuit 81 can always be charged by a constant current in a manner completely free from the fluctuations in the source voltage.

Further, the abovementioned constant voltage circuit and the resistors 88, 89 in series-connection constitute the reference voltage generation circuit 84, in which a constant reference voltage is generated at the connection of the two resistors without regard to the fluctuations in the source voltage.

The switching circuit 86 is constructed with transistors 98, 106, and capacitor 107, a silicon controlled rectifier (S.C.R.) 108, a relay winding 99, and a relay switch 100 to be actuated by the relay winding 99.

A discharging switch 96 for the capacitor 93, unlike that shown in FIG. 6(B), is a relay switch which is to be actuated by the relay winding 99 and is constructed in such a way that it is open while current is flowing through the relay winding 99.

According to the above-explained circuit construction, the power source 21 and the switch 20 are accommodated in the camera body, and the remaining component circuits are all placed within the film magazine, both of which are then conveniently coupled by connectors 101a, 101b.

The embodiment of the afore-described construction operates in the following manner.

As soon as the motor M1 with the camera body (vide: FIG. 2(C)) commences operation, the switch 20 interconnected with the film transfer mechanism is closed, whereby electric current flows through the relay winding 99, the relay switch 100 is turned to a contact 100a to drive the motor M2, and, at the same time, the relay switch 96 for discharging is opened to charge the capacitor 93 with a constant current.

When the film strip is wound on the winding spool for one frame by the motor M2, the transistor 97 of the comparison circuit 85 is brought to a conductive state, since the resistance value of the variable resistor 90 of the constant current circuit 80 and the electrostatic capacitance value of the capacitor 93 in the same circuit have been so selected that the difference between the reference voltage and the sum of the terminal voltage of the capacitor 93 and the output voltage of the source voltage detection circuit 82 reaches a predetermined value upon completion of this one film frame winding. In this consequence, the transistor 106 and the rectifier 108 become also conductive, while the transistor 98 becomes non-conductive to cut the current flowing into the relay winding 99, whereby the relay switch 100 is connected to another contact 100b and the motor M2 stops instantaneously. On the other hand, the relay switch 96 for discharging is also closed to discharge the electric charge in the capacitor 93. When the capacitor 93 is discharged, both transistors 97, 106 becomes non-conductive. However, as the silicon controlled rectifier (S.C.R.) 108 is still in a conductive state, no current flows through the relay winding 99, so that there is neither possibility of the motor M2 becoming conductive nor the capacitor 93 being charged.

Subsequently, when the switch 20 is opened by the film transfer mechanism, the silicon controlled rectifier 108 is brought to a non-conductive state. Incidentally, diodes 110, 111, and 112 are used for temperature compensation in this constant current circuit 80.

In the foregoing embodiments of the present invention, the motor M1 and the motor M2 are actuated by the common power source 21. It is of course possible that they may be operated by a separate power source.

In summary, according to the present invention as has been explained hereinabove, various advantages can be realized such that very clear photographic images free from blurs can be obtained, since the film strip extending between the sprocket and the winding spool is given a slight degree of relaxation, which helps remove any residual tension in the film strip after its winding on the spool and prevent the film from displacing its position by a shock of the shutter release; also, since no film perforation is interposed between the adjacent exposed frames of the film, handling of the film strip after the development becomes convenient; and furthermore, since a constant length of the film strip can be wound on the winding spool without being affected by the fluctuations in the power source, the applicable range of the source voltage can be taken very broadly.

Without further analyses, the foregoing description is believed to so fully reveal the gist of the present invention that those skilled in the art, by applying the current knowledge, readily adapt it for various applications wthout omitting features which fairly constitute the essential characteristics of the generic and specific aspects of the contribution to the art rendered by the present invention, and, therefore, such adaptations should and are intended to be comprehended within the meaning and range of equivalence of the appended claims.

We claim:
1. In an electrically-operated photographic camera adapted for use with a long film strip magazine, the combination comprising:
   a. a camera body having film transfer means and a first prime mover for operation of said film transfer means and for simultaneously charging a shutter;
   b. a long strip photographic film magazine adapted to be mounted on said camera body and having therein film winding means and a second prime mover for operating said film winding means;
   c. electric power supply for said prime movers; and
   d. electric control means for stopping said second prime mover and for stopping said first prime mover a predetermined time after stoppage of said second prime mover, whereby a slight degree of slack or relaxation is imparted to the photographic film extending between said film transfer means and said film winding means.

2. The device according to claim 1, wherein said control means comprises a power source, a time constant circuit connected to the second prime mover, and a switch interconnected with said film transfer means to connect and disconnect said first and second prime movers with said power source.

3. The device according to claim 1, wherein said electric control means comprises a power source, a switch interconnected with said film transfer means to connect and disconnect said first and second prime movers with said power source, a CR circuit, a constant current circuit to charge said CR circuit with a constant current, a power source voltage detection circuit to detect a voltage level in said power source and to generate a voltage in proportion to said source voltage, a comparison circuit to compare an output voltage from said power source voltage detection circuit and an output voltage from said CR circuit, a switching circuit to interrupt electric conduction to said second prime mover when the difference between the compared output voltage values in said comparison circuit reaches a predetermined value, whereby the electric conduction time in said second prime mover can be varied almost linearly with respect to said power source voltage.

4. The device according to claim 1, wherein said electric control means comprises a power source, a switch interconnected with said film transfer means to connect and disconnect said first and second prime movers with said power source, a CR circuit, a constant current circuit to charge said CR circuit with a constant current, a power source voltage detection circuit to detect a voltage level in said power source and to generate a voltage in proportion to said source voltage, a summation circuit to generate a sum of an output voltage from said CR circuit and an output voltage from said power source voltage detection circuit, and a reference voltage generation circuit to generate a constant reference voltage without regard to the fluctuations in said power source voltage, a comparison circuit to compare an output voltage from said reference voltage generation circuit and an output voltage from said summation circuit, and a switching circuit to interrupt electric conduction to said second prime mover when the difference between the compared output voltage values in said comparison circuit reaches a predetermined value.

* * * * *

UNITED STATES PATENT OFFICE
CERTIFICATE OF CORRECTION

Patent No. 3,927,413                    Dated December 16, 1975

Inventor(s) SHUJI KIMURA, et al.

It is certified that error appears in the above-identified patent and that said Letters Patent are hereby corrected as shown below:

Column 1, line 24, change "an" to -- and --; line 25, change "fo" to -- of --; line 40, change "int" to -- in --; line 41, change "he" to -- the --.
Column 5, line 51, change "delay" to -- relay --.
Column 6, line 16, change "parted the" to -- parted to the --.
Column 7, line 8, after "relationship" insert a -- ) --.
Column 10, line 51, change "and" to -- a --.

Signed and Sealed this twenty-seventh Day of April 1976

[SEAL]

Attest:

RUTH C. MASON
Attesting Officer

C. MARSHALL DANN
Commissioner of Patents and Trademarks